US012469542B2

(12) United States Patent
Chan et al.

(10) Patent No.: US 12,469,542 B2
(45) Date of Patent: Nov. 11, 2025

(54) SEMICONDUCTOR MEMORY DEVICE WITH MULTIPLE BANKS EACH INCLUDING DECODING CIRCUIT CONTROLLED BY MEMORY-BANK SELECT SIGNALS

(71) Applicant: Winbond Electronics Corp., Taichung (TW)

(72) Inventors: Kai-Lin Chan, Taichung (TW); Kuen-Huei Chang, Taichung (TW)

(73) Assignee: Winbond Electronics Corp., Taichung (TW)

( * ) Notice: Subject to any disclaimer, the term of this patent is extended or adjusted under 35 U.S.C. 154(b) by 214 days.

(21) Appl. No.: 18/362,911

(22) Filed: Jul. 31, 2023

(65) Prior Publication Data

US 2024/0046978 A1     Feb. 8, 2024

(30) Foreign Application Priority Data

Aug. 2, 2022    (TW) .................................. 111129019

(51) Int. Cl.
*G11C 8/12* (2006.01)
*G11C 11/408* (2006.01)
*G11C 11/4091* (2006.01)
*G11C 11/4094* (2006.01)
*G11C 11/4096* (2006.01)
*G11C 11/4097* (2006.01)

(52) U.S. Cl.
CPC ............ *G11C 11/4087* (2013.01); *G11C 8/12* (2013.01); *G11C 11/4091* (2013.01); *G11C 11/4094* (2013.01); *G11C 11/4096* (2013.01); *G11C 11/4097* (2013.01); *G11C 2207/005* (2013.01)

(58) Field of Classification Search
CPC ............ G11C 11/4087; G11C 11/4091; G11C 11/4094; G11C 11/4096; G11C 11/4097
See application file for complete search history.

(56) References Cited

U.S. PATENT DOCUMENTS

| | | | | |
|---|---|---|---|---|
| 5,812,473 | A | * | 9/1998 | Tsai ...................... G11C 7/1006 365/208 |
| 5,818,785 | A | * | 10/1998 | Ohshima .............. G11C 7/1051 365/230.06 |
| 5,822,268 | A | | 10/1998 | Kirihata |
| 5,870,347 | A | * | 2/1999 | Keeth ...................... G11C 8/12 365/230.06 |
| 5,949,732 | A | | 9/1999 | Kirihata |
| 6,067,270 | A | * | 5/2000 | Hwang ..................... G11C 7/18 365/207 |
| 2019/0214066 | A1 | * | 7/2019 | Nakaoka .............. G11C 11/4091 |

* cited by examiner

*Primary Examiner* — Mushfique Siddique
(74) *Attorney, Agent, or Firm* — JCIPRNET

(57) ABSTRACT

Provided is a semiconductor memory device including a plurality of memory banks. Each of the memory banks includes a first memory cell, a second memory cell, a select circuit, and a decoding circuit. The select circuit is respectively coupled to the first and second memory cells through first and second bit lines, and selects the memory cell to be operated according to a first switch signal and a second switch signal. The decoding circuit generates the first switch signal and the second switch signal according to a memory-bank select signal, a first local column select signal, and a second local column select signal.

19 Claims, 4 Drawing Sheets

SEMICONDUCTOR MEMORY DEVICE WITH MULTIPLE BANKS EACH INCLUDING DECODING CIRCUIT CONTROLLED BY MEMORY-BANK SELECT SIGNALS

CROSS-REFERENCE TO RELATED APPLICATION

This application claims the priority benefit of Taiwan application serial no. 111129019, filed on Aug. 2, 2022. The entirety of the above-mentioned patent application is hereby incorporated by reference herein and made a part of this specification.

BACKGROUND

Technical Field

The present disclosure relates to a memory device, particularly relates to a semiconductor memory device with multiple memory banks.

Description of Related Art

A dynamic random access memory (DRAM) with multiple memory banks needs a decoding circuit to ensure that only one memory bank is read or written at a time. While a column decoder can be shared to save the layout area, a conventional decoding circuit requiring a large number of transistors occupies a large space, which is likely to limit the space for the wiring or reduce the performance. Therefore, it is an important task for those in the art to reduce the space occupied by the decoding circuit while maintaining the good performance.

SUMMARY

The disclosure provides a semiconductor memory device capable of improving the structure of a decoding circuit and reducing the number of transistors required.

The semiconductor memory device of the disclosure includes a plurality of memory banks. Each of the memory banks includes a first memory cell, a second memory cell, a select circuit, and a decoding circuit. The first memory cell is coupled to a first bit line. The second memory cell is coupled to a second bit line. The select circuit is coupled to the first memory cell and the second memory cell respectively through the first bit line and the second bit line, and selects a memory cell to be operated according to a first switch signal and a second switch signal. The decoding circuit is coupled to the select circuit, and generates the first switch signal and the second switch signal according to a memory-bank select signal, a first local column select signal, and a second local column select signal.

Based on the above, in the decoding circuit of the semiconductor memory of the disclosure, the conventional power supply voltage is replaced with memory-bank select signals, and a discharge transistor that additionally creates a discharge path to the ground is provided. In this way, even if replacing the power supply voltage with memory-bank select signals causes the switch signal being insufficiently low logic level, the disclosure is able to make it sufficient. In addition, under the premise of good performance, the number of transistors and the space occupied by the decoding circuit may be reduced by the present disclosure.

To make the above-mentioned features and advantages of the disclosure more comprehensible, the following embodiments are described in detail with reference to the following drawings.

DESCRIPTION OF THE EMBODIMENTS

Figure 1:
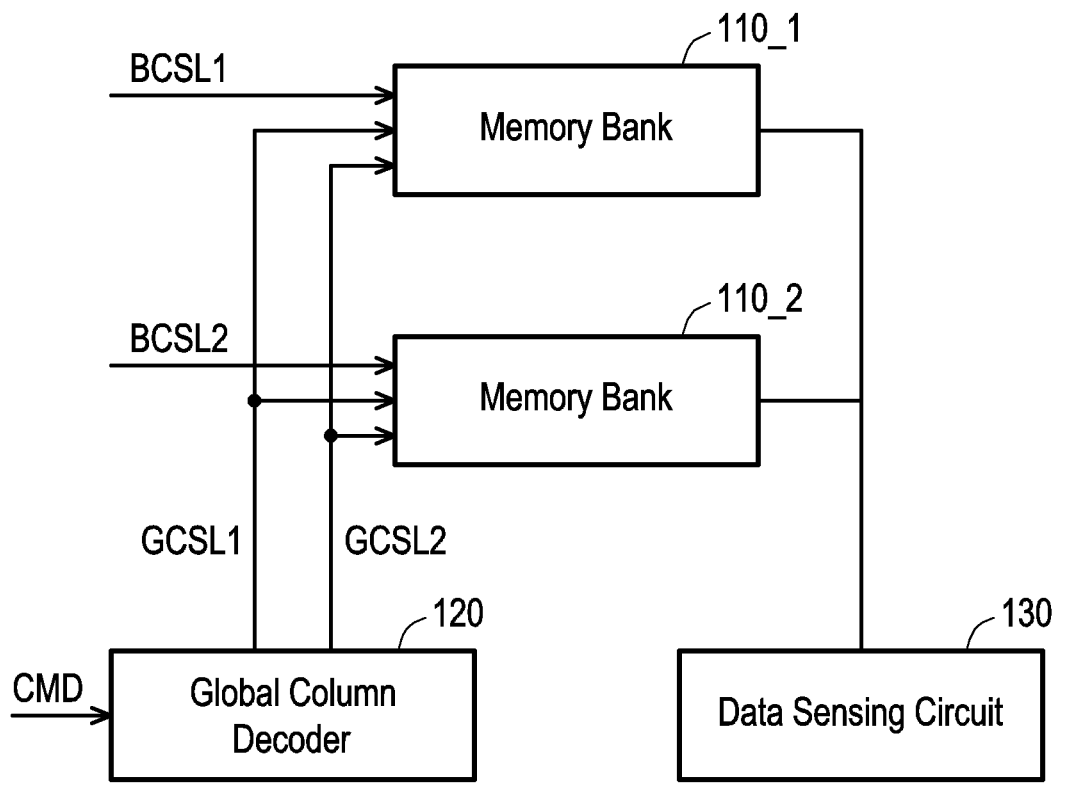
FIG. 1 is a schematic block diagram of a semiconductor memory device according to an embodiment of the disclosure.
Figure 2:
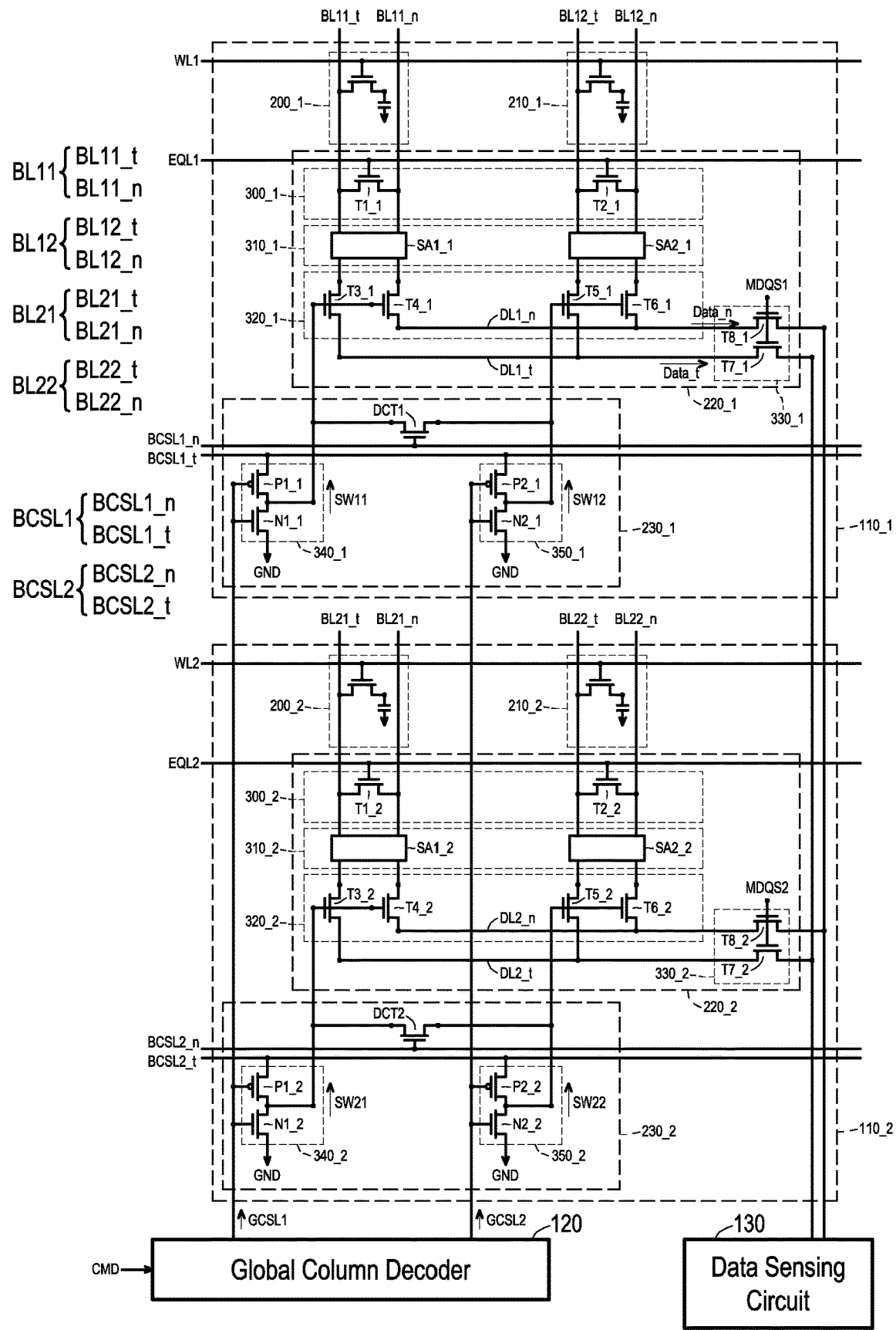
FIG. 2 is a schematic circuit diagram of the semiconductor memory device of the embodiment of FIG. 1.

Please refer to FIG. 1 and FIG. 2, the semiconductor memory device 100 is, for example, a DRAM. According to the present disclosure, the semiconductor memory device 100 includes a memory bank 110_1, a memory bank 110_2, a global column decoder 120, and a data sensing circuit 130.

As shown in FIG. 2, the memory bank 110_1 includes a first memory cell 200_1, a second memory cell 210_1, a select circuit 220_1, and a decoding circuit 230_1. The first memory cell 200_1 is coupled to a first bit line BL11 and a word line WL1, and the second memory cell 210_1 is coupled to a second bit line BL12 and the word line WL1. The select circuit 220_1 is coupled to the first memory cell 200_1 and the second memory cell 210_1 respectively through the first bit line BL11 and the second bit line BL12. The select circuit 220_1 selects the memory cell to be operated according to a first switch signal SW11 and a second switch signal SW12. In this embodiment, the first bit line BL11 includes a first bit line BL11_$t$ and a first bit line BL11_$n$, and the second bit line BL12 includes a second bit line BL12_$t$ and a second bit line BL12_$n$.

The select circuit 220_1 includes a bit line equalization circuit 300_1, a sensing circuit 310_1, a switch circuit 320_1, and an internal data circuit 330_1. The bit line equalization circuit 300_1 is coupled to the first bit line BL11 and the second bit line BL12, and stabilizes the voltages on the first bit line BL11 and the second bit line BL12 according to the equalization signal EQL1. The bit line equalization circuit 300_1 includes a transistor T1_1 and a transistor T2_1. The transistor T1_1 is coupled between the first bit line BL11_$t$ and the first bit line BL11_$n$, and precharges the first bit lines BL11_$t$ and BL11_$n$ according to the equalization signal EQL1 to stabilize the voltages on the first bit lines BL11_$t$ and BL11_$n$. The transistor T2_1 is coupled between the second bit line BL12_$t$ and the second bit line BL12_$n$, and precharges the second bit lines BL12_$t$ and BL12_$n$ according to the equalization signal EQL1 to stabilize the voltages on the second bit lines BL12_$t$ and BL12_$n$.

The sensing circuit 310_1 includes a sense amplifier SA1_1 and a sense amplifier SA2_1. The sense amplifier SA1_1 is coupled to the first bit lines BL11_$t$ and BL11_$n$, and the sense amplifier SA2_1 is coupled to the second bit lines BL12_$t$ and BL12_$n$. The sense amplifiers SA1_1 and SA2_1 read or write the first memory cell 200_1 and the second memory cell 210_1 respectively through the first bit lines BL11_$t$ and BL11_$n$ and the second bit lines BL12_$t$ and BL12_$n$.

The switch circuit 320_1 is coupled to the first bit line BL11 and the second bit line BL12 to receive the first switch signal SW11 and the second switch signal SW12, and selects one of the first bit line BL11 and the second bit line BL12 to transmit data signals Data_n and Data_t. The switch circuit 320_1 includes transistors T3_1, T4_1, T5_1, and T6_1. The transistor T3_1 is coupled between the first bit line BL11_t and the data line DL1_t, and is turned on or off according to the first switch signal SW11. The transistor T4_1 is coupled between the first bit line BL11_n and the data line DL1_n, and is turned on or off according to the first switch signal SW11. The transistor T5_1 is coupled between the second bit line BL12_t and the data line DL1_t, and is turned on or off according to the second switch signal SW12. The transistor T6_1 is coupled between the second bit line BL12_n and the data line DL1_n, and is turned on or off according to the second switch signal SW12.

The internal data circuit 330_1 is coupled to the switch circuit 320_1 through the data lines DL1_t and DL1_n to determine whether or not to connect the transmission path between the data lines DL1_t and DL1_n and the data sensing circuit 130 according to a data select signal MDQS1. The internal data circuit 330_1 includes a transistor T7_1 and a transistor T8_1. The transistor T7_1 is coupled between the data line DL1_t and the data sensing circuit 130, and is turned on or off according to the data select signal MDQS1. The transistor T8_1 is coupled between the data line DL1_n and the data sensing circuit 130 and is turned on or off according to the data select signal MDQS1.

The global column decoder 120 decodes the operation command CMD and generates the first local column select signal GCSL1 and the second local column select signal GCSL2 accordingly. The data sensing circuit 130 is coupled to the internal data circuits 330_1 and 330_2 to read or write the memory banks 110_1 and 110_2.

The decoding circuit 230_1 is coupled to the select circuit 220_1. The decoding circuit 230_1 generates the first switch signal SW11 and the second switch signal SW12 according to the memory-bank select signal BCSL1, the first local column select signal GCSL1, and the second local column select signal GCSL2. In this embodiment, the memory-bank select signal BCSL1 includes a first memory-bank select signal BCSL1_t and a second memory-bank select signal BCSL1_n. The logic level of the first memory-bank select signal BCSL1_t is opposite to the logic level of the second memory-bank select signal BCSL1_n. The semiconductor memory device 100 selects the memory bank to be operated according to the memory-bank select signal BCSL1.

As shown in FIG. 2, the decoding circuit 230_1 includes a first inverter 340_1, a second inverter 350_1, and a discharge transistor DCT1. The first inverter 340_1 is coupled between the first memory-bank select signal BCSL1_t and the ground voltage GND. The input terminal of the first inverter 340_1 receives the first local column select signal GCSL1, and the output terminal of the first inverter 340_1 outputs the first switch signal SW11. The second inverter 350_1 is coupled between the first memory-bank select signal BCSL1_t and the ground voltage GND. The input terminal of the second inverter 350_1 receives the second local column select signal GCSL2, and the output terminal of the second inverter 350_1 outputs the second switch signal SW12.

The discharge transistor DCT1 is coupled between the output terminal of the first inverter 340_1 and the output terminal of the second inverter 350_1. The discharge transistor DCT1 is turned on or off according to the second memory-bank select signal BCSL1_n. For example, when the memory bank 110_1 is not selected for operation, the second memory-bank select signal BCSL1_n is at a high logic level. Therefore, in the unselected memory bank 110_1, the discharge transistor DCT1 is turned on to pull down the first switch signal SW11 and the second switch signal SW12 synchronously.

When the memory bank 110_1 is selected for operation, the second memory-bank select signal BCSL1_n is at a low logic level. Therefore, in the selected memory bank 110_1, the discharge transistor DCT1 is turned off, and the first inverter 340_1 and the second inverter 350_1 respectively determine the logic level of the first switch signal SW11 and the second switch signal SW12 according to the first local column select signal GCSL1 and the second local column select signal GCSL2.

Specifically speaking, the first inverter 340_1 includes a first P-type field-effect transistor P1_1 and a first N-type field-effect transistor N1_1. The first P-type field-effect transistor P1_1 has a first terminal for receiving the first memory-bank select signal BCSL1_t, a control terminal coupled to the input terminal of the first inverter 340_1, and a second terminal coupled to the output terminal of the first inverter 340_1. The first N-type field-effect transistor N1_1 has a first terminal coupled to the output terminal of the first inverter 340_1, a control terminal coupled to the input terminal of the first inverter 340_1, and a second terminal coupled to the ground voltage GND.

The second inverter 350_1 includes a second P-type field-effect transistor P2_1 and a second N-type field-effect transistor N2_1. The second P-type field-effect transistor P2_1 has a first terminal for receiving the first memory-bank select signal BCSL1_t, a control terminal coupled to the input terminal of the second inverter 350_1, and a second terminal coupled to the output terminal of the second inverter 350_1. The second N-type field-effect transistor N2_1 has a first terminal coupled to the output terminal of the second inverter 350_1, a control terminal coupled to the input terminal of the second inverter 350_1, and a second terminal coupled to the ground voltage GND.

Figure 3A:
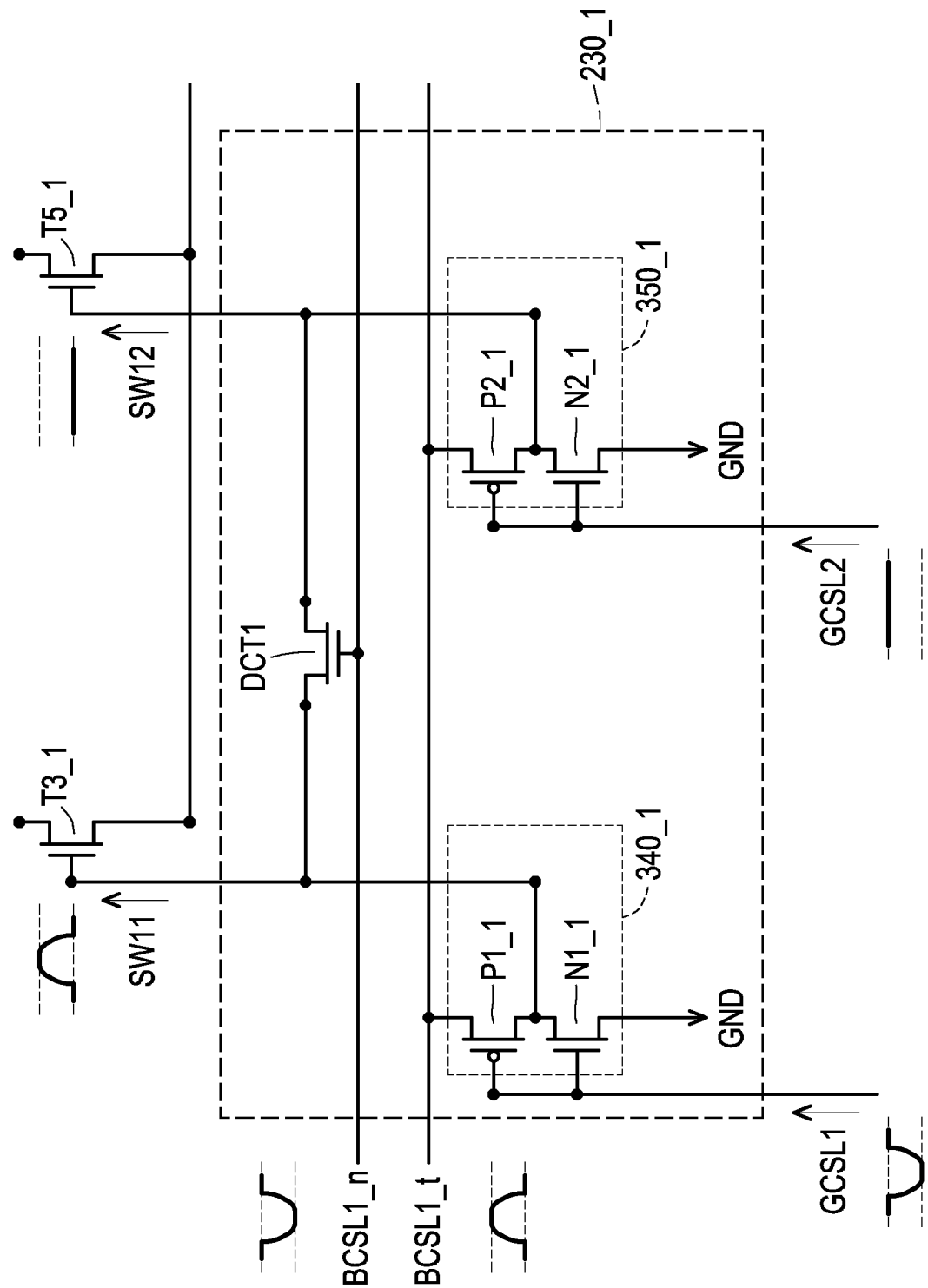
FIG. 3A and FIG. 3B illustrate an example of an operation scheme for a decoding circuit according to an embodiment of the disclosure.

The example of FIG. 3A shows the operation scheme for the decoding circuit 230_1 when the first memory cell 200_1 in the memory bank 110_1 is selected to perform the write operation or the read operation. As shown in FIG. 3A, when the global column decoder 120 receives the operation command CMD for selecting the first memory cell 200_1 in the memory bank 110_1 to be operated, the global column decoder 120 generates the first local column select signal GCSL1 (represented by the downward wave in FIG. 3A) at a low logic level and the second local column select signal GCSL2 at a high logic level, in which the dotted lines in FIG. 3A is to show the difference in logic level. And, the first memory-bank select signal BCSL1_t is at a high logic level, and the second memory-bank select signal BCSL1_n is at a low logic level. At this time, the discharge transistor DCT1 is turned off according to the second memory-bank select signal BCSL1_n, and the logic levels of the first switch signal SW11 and the second switch signal SW12 are determined by the first inverter 340_1 and the second inverter 350_1 according to the first local column select signal GCSL1 and the second local column select signal GCSL2 respectively.

Specifically speaking, as the first inverter 340_1 and the second inverter 350_1 are both coupled between the first memory-bank select signal BCSL1_t at a high logic level and the ground voltage GND, the first inverter 340_1 that receives the first local column select signal GCSL1 at a low logic level generates the first switch signal SW11 at a high logic level, and the second inverter 350_1 that receives the second local column select signal GCSL2 at a high logic level generates the second switch signal SW12 at a low logic level. Therefore, the transistor T3_1 is turned on by the first switch signal SW11 at a high logic level, and the transistor T5_1 is turned off by the second switch signal SW12 at a low logic level, such that the select circuit 220_1 selects the first memory cell 200_1 to be operated.

Figure 3B:
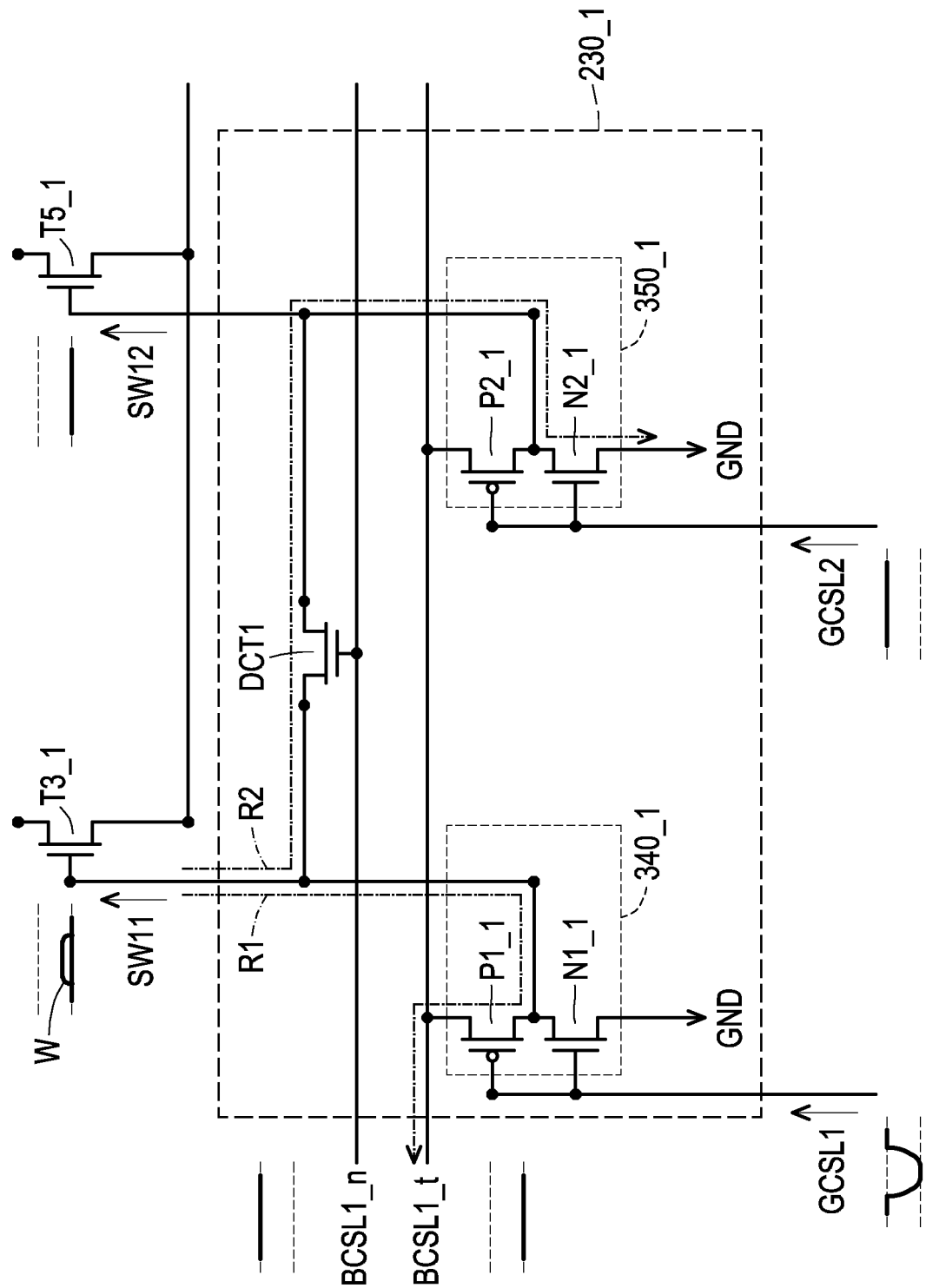

The example of FIG. 3B shows the operation scheme for the decoding circuit 230_1 in the unselected memory bank 110_1 when the first memory cell 200_2 in the memory bank 110_2 is selected to perform the write operation or the read operation. As shown in FIG. 3B, as the decoding circuits 230_1 and 230_2 of the memory banks 110_1 and 110_2 in the semiconductor memory device 100 share the same first local column select signal GCL1 and the same second local column select signal GCL2, even if the memory bank 110_1 is not selected for operation, the first inverter 340_1 in the decoding circuit 230_1 still receives the first local column select signal GCSL1 at a low logic level, and the second inverter 350_1 still receives the second local column select signal GCSL2 at a high logic level. Different from the example of FIG. 3A, the first memory-bank select signal BCSL1_t received by the decoding circuit 230_1 is at a low logic level, and the second memory-bank select signal BCSL1_n is at a high logic level. At this time, the discharge transistor DCT1 is turned on according to the second memory-bank select signal BCSL1_n, and pulls down the first switch signal SW11 and the second switch signal SW12 synchronously.

Specifically speaking, in the first inverter 340_1 that receives the first local column select signal GCSL1 at a low logic level, the first P-type field-effect transistor P1_1 is turned on, the first N-type field-effect transistor N1_1 is turned off. Through the path R1, the first switch signal SW11 is therefore pulled low due to the first memory-bank select signal BCSL1_t. However, the first memory-bank select signal BCSL1_t has a poorer pull-down effect compared to the ground voltage GND. As shown by the wave W in FIG. 3B, the first switch signal SW11 cannot be pulled down to a complete low logic level only through the first inverter 340_1. Therefore, in this embodiment, the discharge transistor DCT1 is turned on according to the second memory-bank select signal BCSL1_n, such that the second N-type field-effect transistor N2_1 that is turned on by the second local column select signal GCSL2 at a high logic level may assist in pulling down the first switch signal SW11 through the path R2. Therefore, the first switch signal SW11 and the second switch signal SW12 are pulled down synchronously to a low logic level, such that the transistor T3_1 and the transistor T5_1 are turned off at the same time to prevent unnecessary movement of electric charges from interfering with the read and write operations.

On the other hand, as shown in FIG. 2, the internal structure of the memory bank 110_2 is the same as that of the memory bank 110_1. The memory bank 110_2 includes a first memory cell 200_2, a second memory cell 210_2, a select circuit 220_2, and a decoding circuit 230_2. The first memory cell 200_2 is coupled to the first bit line BL21 and the word line WL2, and the second memory cell 210_2 is coupled to the second bit line BL22 and the word line WL2. The select circuit 220_2 is coupled to the first memory cell 200_2 and the second memory cell 210_2 respectively through the first bit line BL21 and the second bit line BL22, and selects the memory cell to be operated according to the first switch signal SW21 and the second switch signal SW22. In this embodiment, the first bit line BL21 includes a first bit line BL21_t and a first bit line BL21_n, and the second bit line BL22 includes a second bit line BL22_t and a second bit line BL22_n.

The select circuit 220_2 includes a bit line equalization circuit 300_2, a sensing circuit 310_2, a switch circuit 320_2, and an internal data circuit 330_2. As shown in FIG. 2, the bit line equalization circuit 300_2 includes transistors T1_2 and T2_2 controlled by the equalization signal EQL2. The sensing circuit 310_2 includes sense amplifiers SA1_2 and SA2_2. The switch circuit 320_2 includes transistors T3_2, T4_2, T5_2, and T6_2. The internal data circuit 330_2 includes transistors T7_2 and T8_2 to determine whether or not to connect the transmission paths between the data lines DL2_t and DL2_n and the data sensing circuit 130 according to the data select signal MDQS2.

The decoding circuit 230_2 generates the first switch signal SW21 and the second switch signal SW22 according to the memory-bank select signal BCSL2, the first local column select signal GCSL1, and the second local column select signal GCSL. In this embodiment, the memory-bank select signal BCSL2 includes a first memory-bank select signal BCSL2_t and a second memory-bank select signal BCSL2_n. The logic level of the first memory-bank select signal BCSL2_t is opposite to the logic level of the second memory-bank select signal BCSL2_n. The decoding circuit 230_2 includes a first inverter 340_2, a second inverter 350_2, and a discharge transistor DCT2. The first inverter 340_2 includes a first P-type field-effect transistor P1_2 and a first N-type field-effect transistor N1_2. The second inverter 350_2 includes a second P-type field-effect transistor P2_2 and a second N-type field-effect transistor N2_2. As the function and operation scheme of the elements in the memory bank 110_2 are the same as or similar to those of the corresponding elements in the memory bank 110_1, the same description is not repeated herein.

Although the embodiment is exemplified by the semiconductor memory device 100 with two memory banks 110_1 and 110_2, the disclosure is not limited to the number of memory banks described. The disclosure is also not limited to the number of memory cells described. Those skilled in the art can adjust the number of memory banks and memory cells as needed with reference to the teaching of the embodiment.

To sum up, in the decoding circuit of the semiconductor memory of the disclosure, two simple inverters and a discharge transistor are provided to additionally create a discharge path to the ground according to memory-bank select signals. With the discharge transistor, even if replacing the power supply voltage with memory-bank select signals may cause the switch signal being insufficiently low logic level, the disclosure is able to make it sufficient. In addition, under the premise of good performance, the number of transistors and the space occupied by the decoding circuit may be reduced by the present disclosure.

The present disclosure is suitable for providing miniaturized semiconductor memory device, so as to increase the total number of dies on a wafer. Therefore, the production cost and energy consumption of manufacturing a single integrated circuit (IC) are reduced, and the production energy consumption of subsequent packaging is also reduced, thereby reducing carbon emissions in the process of producing semiconductor memory device. Besides, for high bandwidth application, as the I/O number increases, the area ratio occupied by the column decoder increases, thereby increasing the demand for miniaturing the column decoder. By adopting the present disclosure in high bandwidth application, for example, high bandwidth memory (HBM) or three-dimensional IC with high bandwidth, it is easier to achieve miniaturization of high bandwidth device. Accordingly, the present disclosure may be used in an artificial intelligence device, a high performance computing device, or an electric vehicle. Therefore, the present disclosure provides a sustainable semiconductor memory device.

Moreover, the present disclosure may be used on automotive electronics, such as Advanced Driver Assistance Systems (ADAS), Instrument Clusters, Infotainment. The present disclosure may be used on Industrial applications, such as aerospace, medical, safety equipment, health & fitness, industrial controls, instrumentation, security, transportation, telecommunications, PoS machines, human machine interface, programmable logic controller, smart meter, and industrial networking. The present disclosure may be used on communication and networking devices such as STB, switches, routers, passive optical networks, xDSL, wireless access point, cable modem, power line communications M2M, mobile phones, base stations, DECT phones, and many other new communication products. The present disclosure may be used on desktops, notebooks, servers, gaming notebooks, ultrabooks, tablets, convertibles, HDD, and SSD. The present disclosure may be used on space constrained applications including Wearable, MP3 players, smart watches, games, digital radio, toys, cameras, digital photo album, GPS, Bluetooth and WiFi modules. The present disclosure may be used on television, display and home electronics.

Although the embodiments of the disclosure have been described in detail, the disclosure is not limited to these embodiments, as various modifications and changes can be made within the scope of the disclosure described in the claims.

What is claimed is:

1. A semiconductor memory device comprising a plurality of memory banks, each of the memory banks comprising:
   a first memory cell, coupled to a first bit line;
   a second memory cell, coupled to a second bit line;
   a select circuit, coupled to the first memory cell and the second memory cell respectively through the first bit line and the second bit line and adapted to select a memory cell to be operated according to a first switch signal and a second switch signal; and
   a decoding circuit, coupled to the select circuit and adapted to generate the first switch signal and the second switch signal according to a memory-bank select signal, a first local column select signal, and a second local column select signal,
   wherein the memory-bank select signal comprises a first memory-bank select signal and a second memory-bank select signal, and the decoding circuit comprises:
   a discharge transistor, coupled to the first switch signal and the second switch signal, and configured to be turned on or off according to the second memory-bank select signal, wherein the discharge transistor is configured to be turned on to pull down the first switch signal and the second switch signal synchronously in an unselected memory bank.

2. The semiconductor memory device according to claim 1, wherein the decoding circuit comprises:
   a first inverter, coupled between the first memory-bank select signal and a ground voltage, wherein an input terminal of the first inverter receives the first local column select signal, and an output terminal of the first inverter outputs the first switch signal; and
   a second inverter, coupled between the first memory-bank select signal and the ground voltage, wherein an input terminal of the second inverter receives the second local column select signal, and an output terminal of the second inverter outputs the second switch signal.

3. The semiconductor memory device according to claim 1, wherein a logic level of the first memory-bank select signal is opposite to a logic level of the second memory-bank select signal.

4. The semiconductor memory device according to claim 2, wherein:
   the discharge transistor is coupled between the output terminal of the first inverter and the output terminal of the second inverter.

5. The semiconductor memory device according to claim 2, wherein in a memory bank selected, the corresponding discharge transistor is turned off, and the first inverter and the second inverter respectively determine a logical level of the corresponding first switch signal and the corresponding second switch signal according to the first local column select signal and the second local column select signal.

6. The semiconductor memory device according to claim 2, wherein in a memory bank selected, the first inverter that receives the first local column select signal at a low logic level generates the first switch signal at a high logic level, and the second inverter that receives the second local column select signal at a high logic level generates the second switch signal at a low logic level.

7. The semiconductor memory device according to claim 2, wherein the first inverter comprises:
   a first P-type field-effect transistor, having a first terminal for receiving the first memory-bank select signal, a control terminal coupled to the input terminal of the first inverter, and a second terminal coupled to the output terminal of the first inverter; and
   a first N-type field-effect transistor, having a first terminal coupled to the output terminal of the first inverter, a control terminal coupled to the input terminal of the first inverter, and a second terminal coupled to the ground voltage.

8. The semiconductor memory device according to claim 7, wherein the second inverter comprises:
   a second P-type field-effect transistor, having a first terminal for receiving the first memory-bank select signal, a control terminal coupled to the input terminal of the second inverter, and a second terminal coupled to the output terminal of the second inverter; and
   a second N-type field-effect transistor, having a first terminal coupled to the output terminal of the second inverter, a control terminal coupled to the input terminal of the second inverter, and a second terminal coupled to the ground voltage.

9. The semiconductor memory device according to claim 8, wherein in a memory bank unselected, in the first inverter that receives the first local column select signal at a low logic level, the first P-type field-effect transistor is turned on, the first N-type field-effect transistor is turned off, the first switch signal is therefore pulled low due to the first memory-bank select signal.

10. The semiconductor memory device according to claim 9, wherein in the memory bank unselected, the discharge transistor coupled between the output terminal of the first inverter and the output terminal of the second inverter is turned on, such that the second N-type field-effect transistor that is turned on due to receiving the second local column select signal at a high logic level assists in pulling down the first switch signal.

11. The semiconductor memory device according to claim 1, wherein the semiconductor memory device selects a memory bank to be operated according to the memory-bank select signal.

12. The semiconductor memory device according to claim 1, wherein the decoding circuits of the memory banks share the same first local column select signal and the same second local column select signal.

13. The semiconductor memory device according to claim 1, further comprising:
a global column decoder, adapted to decode an operation command and generate the first local column select signal and the second local column select signal accordingly.

14. The semiconductor memory device according to claim 1, further comprising:
a data sensing circuit, coupled to the select circuit for reading or writing the memory banks.

15. The semiconductor memory device according to claim 14, wherein the select circuit comprises:
a bit line equalization circuit, coupled to the first bit line and the second bit line and adapted to stabilize a voltage of the first bit line and the second bit line according to an equalization signal;
a sensing circuit, coupled to the first bit line and the second bit line and adapted to read or write the first memory cell and the second memory cell through the first bit line and the second bit line;
a switch circuit, coupled to the first bit line and the second bit line and adapted to receive the first switch signal and the second switch signal and select one of the first bit line and the second bit line accordingly for transmission of data signals; and
an internal data circuit, coupled to the switch circuit through a data line and adapted to determine whether or not to connect a transmission path between the data line and the data sensing circuit according to a data select signal.

16. The semiconductor memory device according to claim 15, wherein the bit line equalization circuit precharges the first bit line and the second bit line according to the equalization signal.

17. The semiconductor memory device according to claim 15, wherein the sensing circuit comprises a plurality of sense amplifiers, the plurality of sense amplifiers read or write the first memory cell and the second memory cell respectively through the first bit line and the second bit line.

18. The semiconductor memory device according to claim 15, wherein the switch circuit comprises a first transistor and a second transistor, the first transistor is coupled between the first bit line and the data line, and is turned on or off according to the first switch signal, the second transistor is coupled between the second bit line and the data line, and is turned on or off according to the second switch signal.

19. The semiconductor memory device according to claim 15, wherein the internal data circuit comprises a third transistor, the third transistor is coupled between the data line and the data sensing circuit, and is turned on or off according to the data select signal.

* * * * *